March 29, 1949.  G. JANSON, JR  2,465,378
CLAMP
Filed July 10, 1946

Inventor
Gotthard Janson, Jr.
By J. H. Church & A. E. Thibodeau
Attorneys

Patented Mar. 29, 1949

2,465,378

UNITED STATES PATENT OFFICE 2,465,378

CLAMP

Gotthard Janson, Jr., Lansing, Mich.

Application July 10, 1946, Serial No. 682,526

4 Claims. (Cl. 248—191)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a device for clamping a pair of telescoped members in any desired telescoped position and is directed more particularly to clamping the legs or supports of such various devices as a mortar weapon, a camera tripod, or the like.

In the case of a mortar weapon, for example, which necessarily must be moved from place to place in times of combat, it is essential that the supporting structure thereof be readily adjustable to properly position the weapon with respect to the terrain which, obviously, varies from point to point of combat. It is, furthermore, most important that once the desired adjustment is made that it be secure.

It is therefore, a principal object of this invention to provide a construction wherein a pair or more of telescoped supporting members adapted for use with any device of the types referred to may be suitably adjusted and firmly clamped into position at any desired height and in such a way that the structure is assured against collapsing during use.

The specific nature of the invention as well as other objects and advantages thereof will clearly appear from a description of a preferred embodiment as shown in the accompanying drawings in which.

Figure 1:
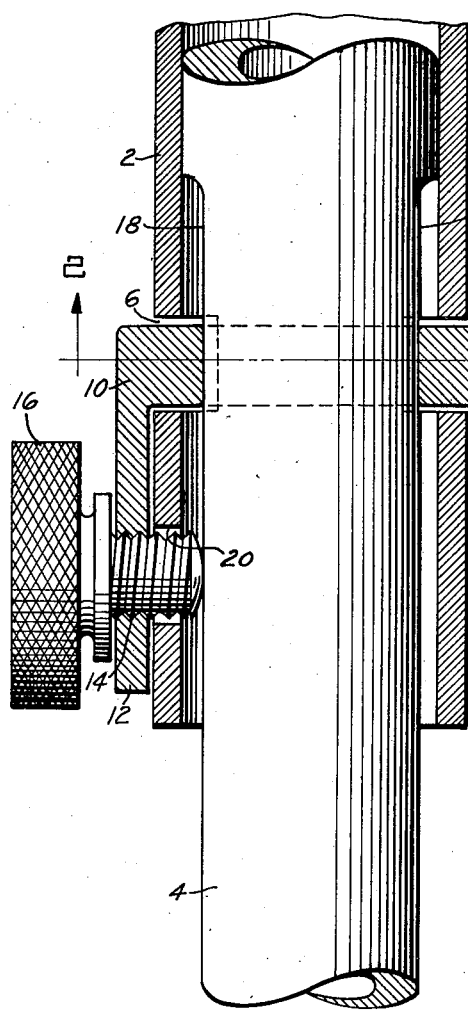
Fig. 1 is a side elevational view with parts in section showing the device of the invention in association with a pair of telescoped members.

There is provided a pair or more of leg members 2, only one of such members being illustrated however, which are hollow and while in the form shown they are tubular, it will be understood that they may be of rectangular or any other geometric section. In any event, each telescopically receives a leg-extension member 4. It will be understood that the legs are devised to act as supports for any device requiring adjustable positioning.

The extension members 4 may obviously be hollow or they may be of solid rod construction. The members 2 will henceforth be referred to as "leg tubes" and the parts 4 will be referred to as "extensions." Each of the hollow members 2 is provided with a pair of diametrically-opposed slots or recesses 6 intermediate the opposite ends thereof. A clearance hole 20 is provided vertically below slots 6 to accommodate a clamping screw 16.

Figure 3:
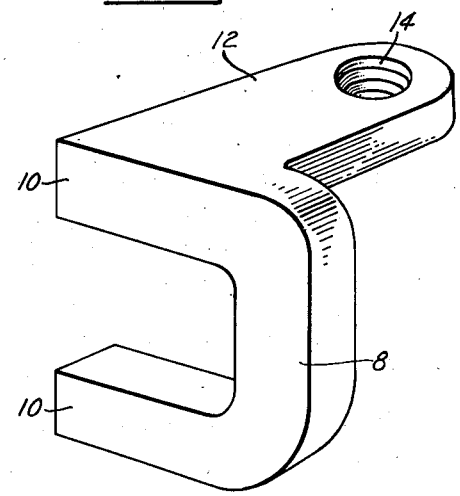
Fig. 3 is a perspective view of the clamp body.

The clamping device of the invention includes a U-shaped body part 8 with opposite arm portions 10. Extending from one of the arms 10, and preferably the upper one thereof as shown in Figs. 1 and 3, is a ledge-like so-called ear portion or lever arm 12. This latter portion 12 is provided with a transverse threaded hole 14 which extends therethrough and this is arranged to receive clamping screw 16 for a purpose which will presently appear.

Figure 2:
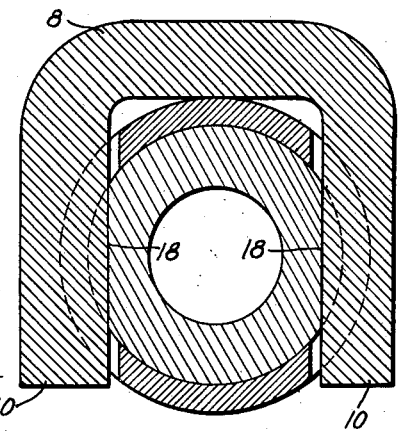
Fig. 2 is a sectional view on the line 2—2 of Fig. 1.

The extension members 4 are provided with oppositely disposed flat surfaces 18, as shown in Figs. 1 and 2, which extend almost their full lengths. These surfaces are substantially parallel and adapted to coincide with the slots 6 above mentioned.

The clamp is so associated with the telescoped members that the arms 10 are disposed in the slots 6 and lightly engage the surfaces 18. In assembled relation, the integral ear member 12 extends in coaxial alignment with the tubes 2 and is adapted to act as a lever member when the clamping screw 16 is turned to force the ear upwardly.

As is apparent, the device of the invention acts essentially on a friction principle. That is to say, with the arms or jaws of the clamp disposed in the slots provided in the leg tube and extending over the two flats on the extension member, the turning of clamping member 16 brings about a fulcrum contact between the lower jaw or arm 10 on the lower extension flat and a frictional contact between the upper jaw or arm 10 and the upper extension flat surface.

Accordingly a locking action is obtained due to the frictional contact and is maintained by the lever action of the ear member 12 on the clamping screw. The hole 20 drilled into the tube not only provides passage for the clamping screw, but prevents the disengagement of the clamp body from the tube until the screw is withdrawn far enough to clear the tube. As is obvious, the proper frictional engagement between the flats on the clamp jaws and the tube and extension prevent relative rotation of the parts as is desired.

I claim:

1. An adjustable support for a device of the class described comprising in combination, a hollow leg member, an extension member telescopically received in said hollow member, said hollow member being provided with a pair of oppositely disposed slots therein, said extension member being provided with oppositely disposed flat surfaces which are arranged to coincide with said slots, and a clamp member consisting of a U-shaped body portion having the arms thereof disposed in said slots and engaging said flat surfaces and including an extending ear portion provided with a transverse threaded opening therethrough, and a screw member threadedly engaged in said threaded opening and adapted to bear against one of said flat surfaces so as to bring about frictional contact between said clamp member and said extension member.

2. An adjustable support for a device of the class described comprising in combination, a hollow leg member, an extension member telescopically received in said hollow member, said hollow member being provided with a pair of oppositely-disposed slots therein, said extension member being provided with oppositely-disposed flat surfaces which are arranged to coincide with said slots, a clamp member including a U-shaped body portion having the arms thereof disposed in said slots and engaging said flat surfaces and an ear portion which extends outwardly from one of said arms, said ear portion being provided with a transverse threaded opening therethrough, and a screw member threadedly engaged in said threaded opening and bearing against one of said flat surfaces in such a way as to bring about frictional contact between said clamp member and said extension member with which it is associated.

3. An adjustable support for a device of the class described comprising in combination, a hollow leg member, an extension member telescopically received in said hollow member, said hollow member being provided with a pair of oppositely disposed and horizontally extending slots therein, said extension member being provided with oppositely-disposed flat surfaces which are arranged to be complemental with said slots, a clamp member including a U-shaped body portion having the arms thereof disposed in said slots and engaging said flat surfaces and an ear portion which extends downwardly from one of said arms, said ear portion being provided with a transverse opening therethrough, and a screw member threadedly engaged in said opening and having its bearing against one of said flat surfaces, all adapted and arranged whereby frictional contact between said clamp member and said extension member with which it is associated may be brought about by the turning of said screw member.

4. An adjustable support for a device of the class described comprising in combination, a hollow leg member, an extension member telescopically received in said hollow member, said hollow member being provided with a pair of oppositely disposed and horizontally extending slots therein, a clearance hole being provided intermediate and axially with one of said slots of said hollow member, said extension member being provided with oppositely disposed flat surfaces which are arranged to be complemental to said slots, a clamp member including a U-shaped body portion having the arms thereof disposed in said slots and engaging said flat surfaces and a near portion which extends downwardly from one of said arms, said ear portion being provided with a transverse threaded opening therethrough, and a screw member threadedly engaged in said opening and extending through said clearance hole bearing against one of said flat surfaces, all adapted and arranged whereby frictional contact between said clamp member and said extension member with which it is associated may be brought about by turning of said screw member locking said extension member in position with said hollow member.

GOTTHARD JANSON, Jr.

REFERENCES CITED

The following references are of record in the file of this patent:

UNITED STATES PATENTS

| Number | Name | Date |
| --- | --- | --- |
| 1,648,200 | Schulze | Nov. 8, 1927 |
| 2,122,868 | Morgan | July 5, 1938 |